United States Patent
Iwai et al.

(10) Patent No.: US 9,545,696 B2
(45) Date of Patent: Jan. 17, 2017

(54) SCREWING SYSTEM

(71) Applicant: CANON KABUSHIKI KAISHA, Tokyo (JP)

(72) Inventors: Hiroaki Iwai, Yokohama (JP); Masato Yanagisawa, Wako (JP)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 14/229,468

(22) Filed: Mar. 28, 2014

(65) Prior Publication Data

US 2014/0290440 A1    Oct. 2, 2014

(30) Foreign Application Priority Data

Apr. 2, 2013 (JP) ................. 2013-076678

(51) Int. Cl.
*B23P 19/06* (2006.01)
*B25J 11/00* (2006.01)

(52) U.S. Cl.
CPC ............... *B23P 19/06* (2013.01); *B25J 11/00* (2013.01)

(58) Field of Classification Search
CPC .................................. B23P 19/06; B25J 11/00
USPC ............................................... 81/57.37–435
See application file for complete search history.

(56) References Cited

U.S. PATENT DOCUMENTS

| | | | | |
|---|---|---|---|---|
| 4,058,884 A | * | 11/1977 | Lydon | B23P 19/06 29/240 |
| 4,639,996 A | * | 2/1987 | Fullmer | B23P 19/065 29/407.02 |
| 4,844,678 A | * | 7/1989 | Schenk | B23Q 3/066 269/309 |
| 4,894,901 A | * | 1/1990 | Soderberg | B23P 19/001 29/428 |
| 5,423,371 A | * | 6/1995 | Landua | B22C 9/103 164/137 |
| 6,763,564 B2 | * | 7/2004 | Ilies | B23P 19/069 29/407.02 |

FOREIGN PATENT DOCUMENTS

JP    2004-66372 A    3/2004

* cited by examiner

*Primary Examiner* — Hadi Shakeri
(74) *Attorney, Agent, or Firm* — Canon U.S.A. Inc., IP Division

(57) ABSTRACT

A screwing system includes at least one screw feeder, and a screwing device configured to move between the screw feeder and a screwing position and tighten a screw obtained from the screw feeder on a part at the screwing position. The screwing system includes a robot capable of holding the part. The robot carries the held part to the screwing position, changes a posture of the part, and carries the part from the screwing position. While the robot holds the part, the screwing device screws the part.

3 Claims, 5 Drawing Sheets

SCREWING SYSTEM

BACKGROUND OF THE INVENTION

Field of the Invention

The present invention relates to a screwing system employed in an assembly system using a robot.

Description of the Related Art

In the manufacturing industry, a system of manufacturing a product includes a line production system and a cell production system. As in these systems, parts are generally conveyed by a robot or a person and manually assembled. In recent years, there has been demanded an assembly system which realizes a manual assembling operation by a robot. Especially, there has been demanded an assembly system in which a robot performs screwing and application. Furthermore, if an assembling operation is performed by a robot instead of a person, reduction in takt time, equipment cost, and installation space has been expected.

In the related art, an assembly system employing manual and robot assembling operations together is known, as disclosed in Japanese Patent Application Laid-Open No. 2004-66372. In the assembly system, a robot performs processes of assembling, screwing, and application, and a person conveys parts each time one of the processes is finished.

The screwing process in the assembly system is performed in a screwing system including a screw feeder, a screwing device, and a workbench. A first step of screwing is to place a part to be screwed on the workbench by a person. After the part is placed on the workbench, the screwing device moves to the screw feeder to obtain a screw, moves to a screwing position, and then screws the positioned part.

However, in the screwing system of the related art, a long takt time may be taken for an operation of placing the part on the workbench by a person and an operation of taking out the screwed part. A robot may perform the operation in a similar manner to a person.

Moreover, in order to tighten a plurality of screws which have different postures, another screwing system needs to be introduced, or a plurality of driving shafts needs to be added so as to change a posture of the workbench or the screw fastener. This may increase the cost. Not only that, the introduction of another screwing system and the increase in the number of driving shafts lead to opening of a new production line and an increase in installation space.

SUMMARY OF THE INVENTION

In light of the above, the present invention is directed to a screwing system capable of reducing a takt time, and dealing with tightening of a plurality of screws which have different postures without increasing the cost or installation space.

According to an aspect of the present invention, a screwing system includes at least one screw feeder, and a screwing device configured to move between the screw feeder and a screwing position and tighten a screw, obtained from the screw feeder, on a part to be screwed at the screwing position. A robot capable of holding the part is provided, and the robot can carry the held part to the screwing position, change a posture of the part, and carry the part from the screwing position. Moreover, the screwing device can tighten the screws while the robot holds the part.

Further features of the present invention will become apparent from the following description of exemplary embodiments (with reference to the attached drawings).

DESCRIPTION OF THE EMBODIMENTS

Figure 1:
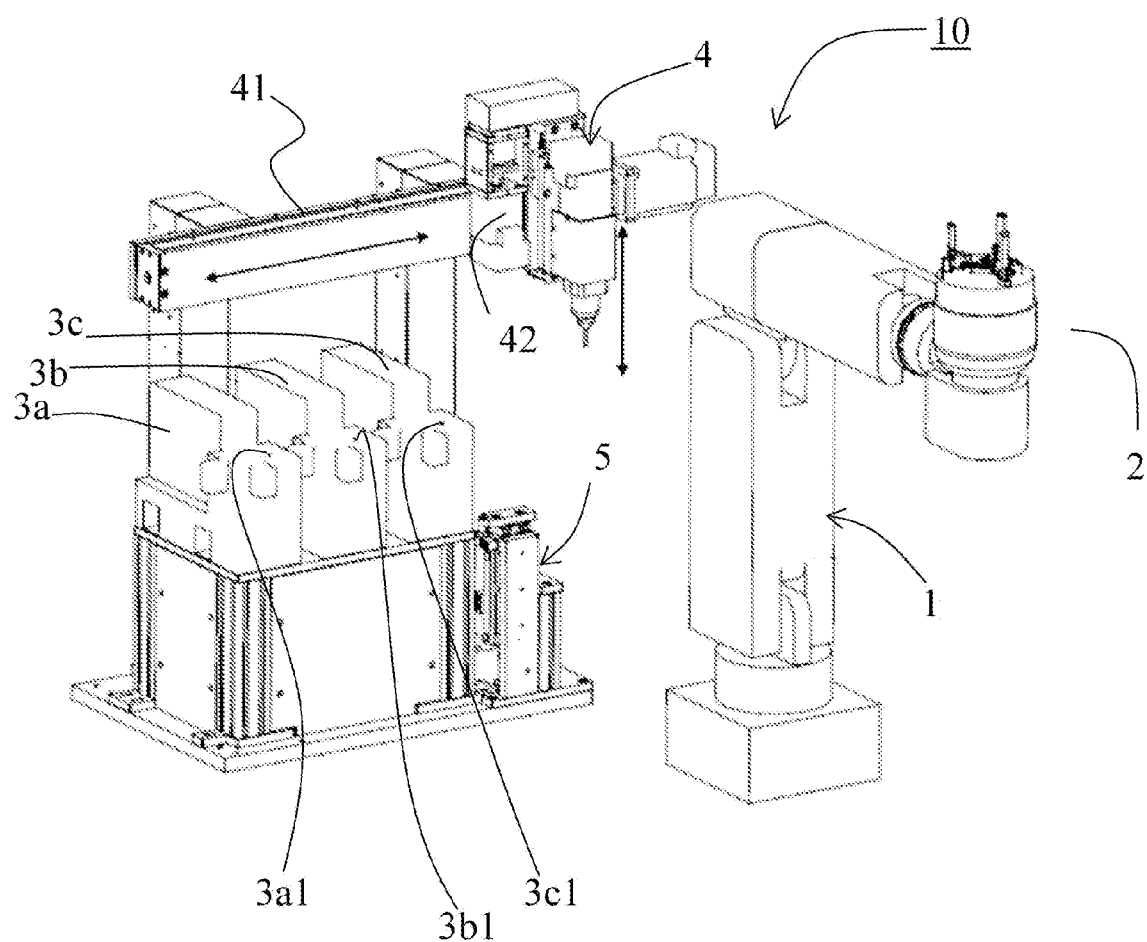
FIG. 1 is a view illustrating the entire structure of a screwing system according to an embodiment of the present invention.

Hereinafter, an embodiment according to the present invention will be described with reference to the accompanying drawings. Note that the same reference numerals denote similar components in the drawings as referred to hereinafter.

A screwing system 10 according to an embodiment of the present invention will be described with reference to FIGS. 1 to 5A and 5B.

The screwing system according to an embodiment of the present invention includes, as illustrated in FIG. 1, a robot 1 including a part holding mechanism unit 2 capable of holding a part, screw feeders 3a to 3c, a screwing device 4, and a screwing assist mechanism unit 5. The robot 1 carries, to a screwing position, a part (first part) held by the part holding mechanism unit 2 and another part connected to the first part at another process and to be fixed by screwing. Next, the screwing device 4 obtains a screw from any one of the screw feeders 3a to 3c to tighten the screw with the screwing assist mechanism unit 5 at the screwing position, and the other part is fixed to the first part with the screw.

Figure 2:
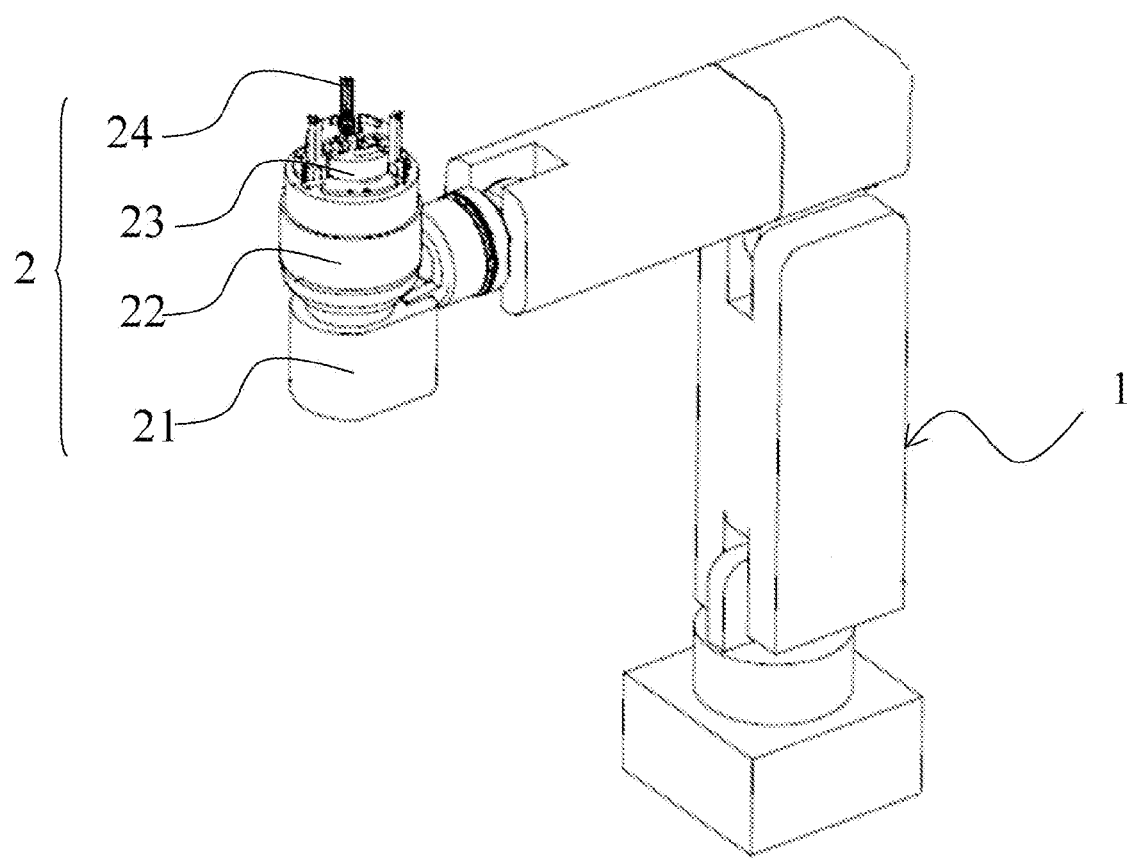
FIG. 2 is a view illustrating an exemplary structure of a robot used in an embodiment of the present invention.

The robot 1 according to the embodiment is a six-axis articulated robot. As illustrated in FIGS. 1 and 2, the posture of the part holding mechanism unit 2 attached to the leading edge of the robot can be changed flexibly. As illustrated in FIG. 2, the part holding mechanism unit 2 includes a rotational shaft unit 21 having a single rotational shaft, a three-jaw chuck unit 22, a spacer unit 23 for controlling a phase of the part, and claws 24 for holding the part. The spacer unit 23 mounted on a bearing surface of the three-jaw chuck unit 22 includes a pin or a groove (not illustrated). The pin or the groove plays a role in controlling the phase of the part. In addition, the claws 24 attached to the leading edge of the three-jaw chuck unit 22 hold the outside or inside of a plurality of types of parts and serve to position the parts. The robot 1 carries, to the screwing position, the parts having the positions and phases determined by the part holding mechanism unit 2. At that time, the robot 1 takes a screwing posture corresponding to each point of screwing. While holding the parts, the robot 1 is supported by the screwing assist mechanism unit 5 described below.

Figure 3:
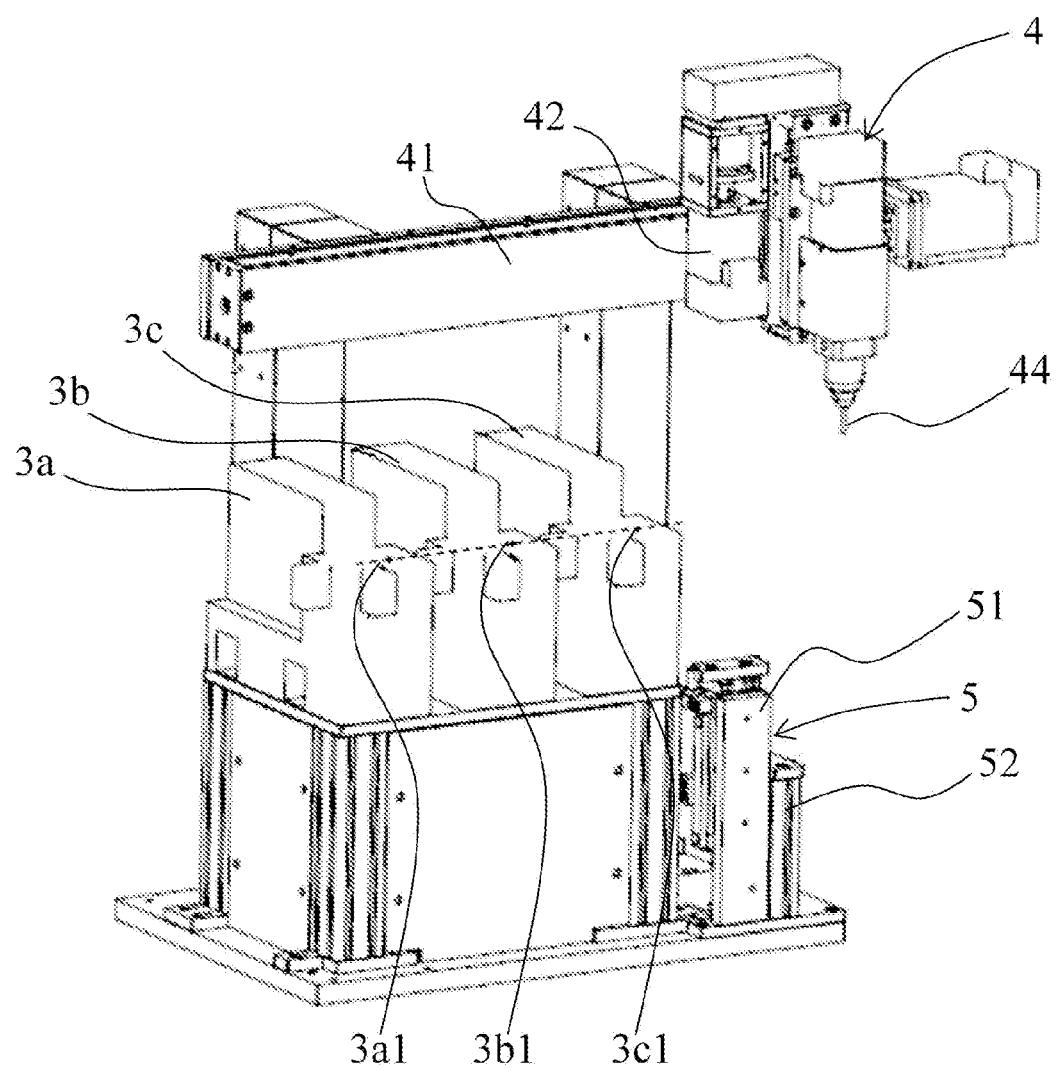
FIG. 3 is a view illustrating a structure around a screw feeder and a screwing device.

As illustrated in FIGS. 1 and 3, in the embodiment, three screw feeders 3a to 3c are provided. The screw feeders 3a to 3c can feed three types of screws corresponding to parts, but at least one of them needs to be provided. Four or more screw feeders may also be provided. The screw feeders 3a to 3c feed screws to the screwing device 4. The screwing device 4 moves in a planar direction, and obtains a screw from any one of the screw feeders 3a to 3c with a screw obtaining unit 44 provided at the leading edge of the screwing device 4 (the lower end of the screwing device 4 in the drawing), as described below. Three types of screw heads are the same in diameter and shape so that the screwing device 4 can deal with the three types of screws without replacing the screw obtaining unit of the screwing device 4. In addition, the screwing device 4 can move in one direction on the plane (X-direction). Specifically, the screwing device 4 can move along an X driving shaft 41 configured to guide the screwing device 4 in the X-direction. The three screw feeders 3a to 3c are arranged in parallel to the X driving shaft 41. Screw obtaining positions 3a1 to 3c1 of the screw feeders 3a to 3c are aligned in the X-direction. The screw obtaining positions 3a1 to 3c1 are positions at which the screwing device 4 obtains screws by the screw obtaining unit 44. Moreover, the screw obtaining positions 3a1 to 3c1 and a screwing position are aligned in the X-direction. If the screw obtaining positions 3a1 to 3c1 and the screwing position are aligned in the X-direction, the screw can be obtained and tightened without the screwing device 4 moving in a Y-direction perpendicular to the X-direction. Thus, a driving shaft for moving the screwing device 4 in the Y-direction is not needed, which reduces space in the Y-direction and cost.

The screwing device 4, as illustrated in FIGS. 1 and 4, is attached to a Z driving shaft 42 configured to guide the screwing device 4 in the vertical direction (Z-direction), and can move in the X-direction along the X driving shaft 41 together with the Z driving shaft 42. The screwing device 4 according to the embodiment is configured to move down along the Z driving shaft 42 and screw the part. When the screwing device 4 moves down along the Z driving shaft 42, a pressing force for screwing can be controlled. The current value of a motor for moving the screwing device 4 in the Z-direction is monitored, and the pressing force can be maintained until the screwing is completed. The screw obtaining unit 44 may include a pipe-shaped member connected to, for example, a suction device and be configured to attract and obtain the head of the screw. A screwdriver to drive a screw for screwing is provided movably up and down inside the pipe-shaped member. Meanwhile, the screwdriver moves down for screwing, and engages the head of the screw attracted by the screw obtaining unit 44 and rotates the screw. The tightening torque of the screw generated by the screwdriver is controlled by the current value of the driving motor of the screwdriver. When a predetermined torque is reached, the driving motor of the screwdriver is stopped and the screwing is completed.

The screwing assist mechanism unit 5 includes, as illustrated in FIGS. 1 and 3, an auxiliary Z driving shaft and a robot assist unit 52. The screwing assist mechanism unit 5 has a mechanism in which, when the part is likely to shift due to lack of rigidity of the robot 1 in screwing the part, the auxiliary Z driving shaft 51 presses and supports the part, and the robot assist unit 52 presses and supports the part holding mechanism unit 2 (holding unit of the part). The screwing assist mechanism unit 5 also has a rigidity that can withstand the pressing force generated by the screwing device 4 moving down along the Z driving shaft 42.

The details of screwing will be described below.

The robot 1 controls the phase of the part with the spacer unit 23 of the part holding mechanism unit 2. After the claws 24 hold the inside of the part, the robot 1 conveys the held part to another process and attaches the held part to another part. Meanwhile, the screw feeders 3a to 3c feed screws to the obtaining positions 3a1 to 3c1 at which the screw obtaining unit 44 obtains the screws. After screw feeding is finished, the screwing device 4 moves along the X driving shaft 41 to above any one of the screw obtaining positions 3a1 to 3c1 at which a necessary screw is obtained, moves down along the Z driving shaft 42, and obtains the screw with the screw obtaining unit 44. The screwing device 4, which has obtained the screw, then moves to the screwing position with the X driving shaft 41 and the Z driving shaft 42. Accordingly, the screwing device 4 tightens the screw while the robot 1 holds the part.

Herein, the screwing operations at different postures of the part will be described with reference to FIGS. 4A and 4B.

Figure 4A:
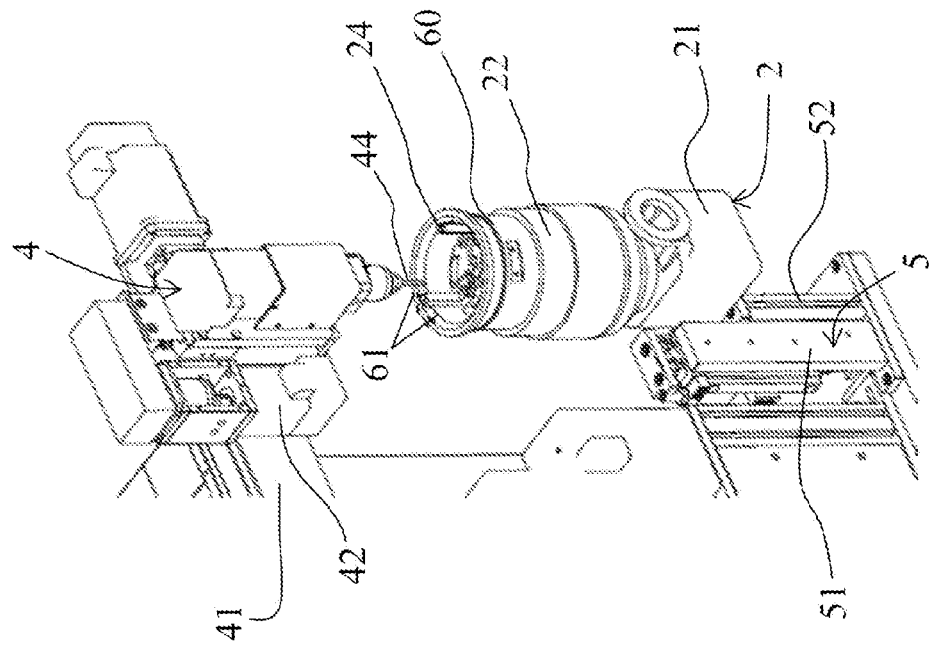
FIG. 4A is a view illustrating a structure around the screwing device and a part holding mechanism unit of the robot, and an explanatory view illustrating a screwing operation in a state where a part is held in the horizontal direction.

When the part 60 is held in the horizontal direction as illustrated in FIG. 4A, the auxiliary Z driving shaft 51 of the screwing assist mechanism unit 5 moves up and presses the underside of the part. After that, the screwing device 4 moves down along the Z driving shaft 42 and starts screwing by the screwdriver which moves up and down inside the pipe-shaped screw obtaining unit 44. A necessary constant pressing force generated by the screwing device 4 is maintained and rotations of the screwdriver reach a constant tightening torque. After that, screwing is finished by the screwdriver. At that time, the screwing device 4 moves up and the auxiliary Z driving shaft 51 of the screwing assist mechanism unit 5 moves down.

Figure 4B:
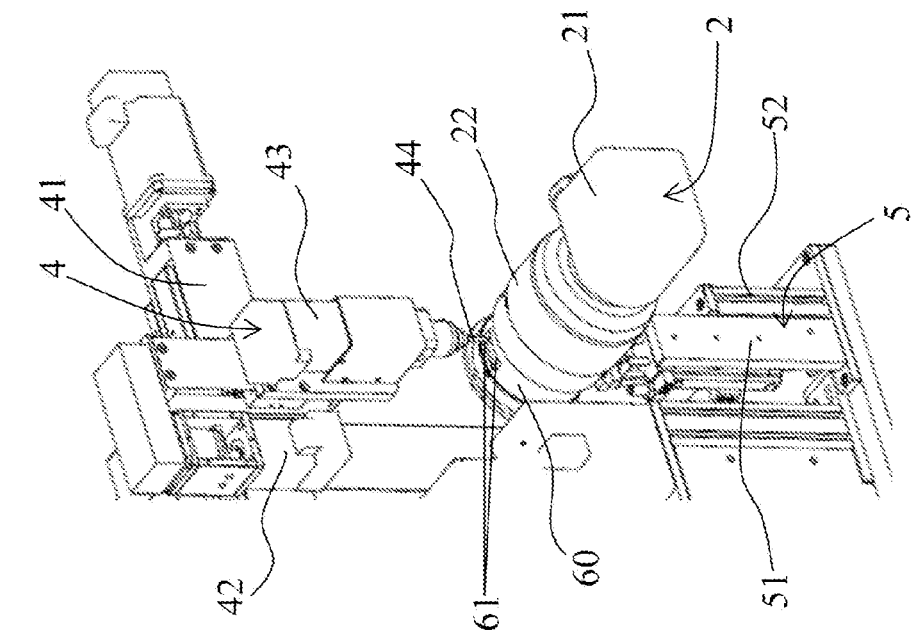
FIG. 4B is a view illustrating a structure around the screwing device and the part holding mechanism unit of the robot, and an explanatory view illustrating the screwing operation in a state where the part is held in the vertical direction.

FIG. 4B illustrates the posture of the part held in the vertical direction. At the posture, the robot assist unit 52 of the screwing assist mechanism unit 5 presses the underside of the rotational shaft unit 21 of the part holding mechanism unit 2 and supports the part. The part holding mechanism unit 2 is a part holding unit of the robot 1. Next, the screwing device 4 moves down along the Z driving shaft 42, and starts screwing by the screwdriver. The screwing device 4 maintains the necessary constant pressing force. After the rotations of the screwdriver reach the constant tightening torque, screwing is finished by the screwdriver and the screwing device 4 moves up.

Figure 5B:
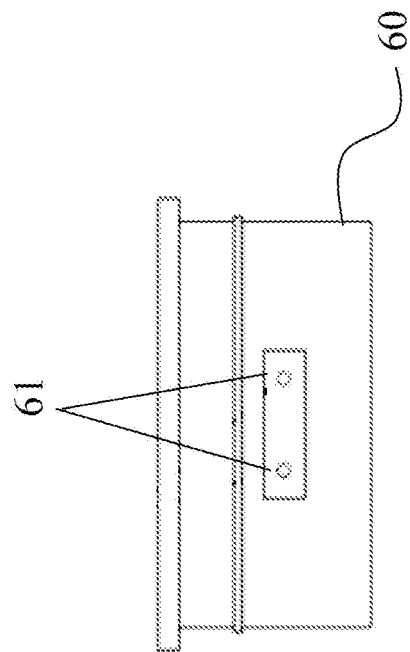
FIG. 5B is a side view illustrating an exemplary part.
Figure 5A:
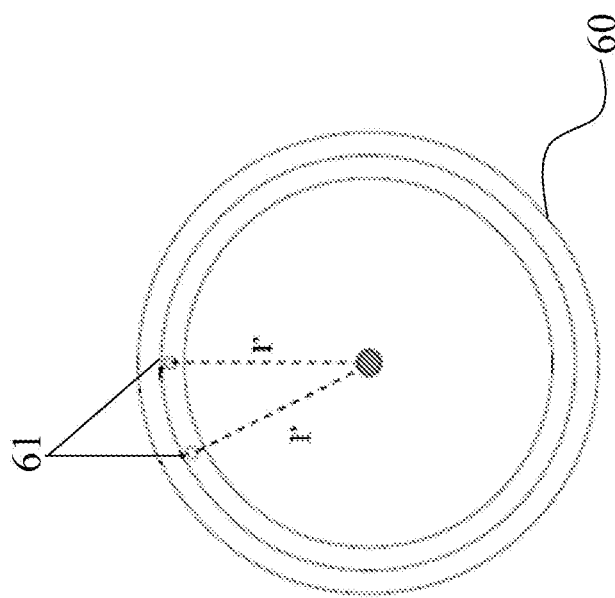
FIG. 5A is a plan view illustrating an exemplary part.

The part 60 includes, as illustrated in FIG. 5A, a plurality of screw holes 61 aligned on the same plane. The screws can be easily inserted into the screw holes 61 for tightening as follows. The part 60 is held in such a way that the screw holes 61 are arranged so as to be parallel to the X driving shaft 41, and the screwing device moves along the X driving shaft 41. In addition, as illustrated in FIG. 5B, the screw holes 61 are arranged on the lateral surface in a circumferential direction of the cylindrical portion. The screws can be easily inserted into the screw holes 61 for tightening if the part 60 is held in such a manner that the central axis of the cylindrical portion is perpendicular to the X driving shaft 41, and the screw holes 61 are arranged in parallel to the X driving shaft 41. In other words, each screw hole 61 can be positioned directly below the screw obtaining unit 44 of the screwing device 4 by rotating the part 60 without moving the screwing device 4. In this manner, the screws can be easily inserted into the screw holes 61 for tightening sequentially.

After screwing is finished, the robot 1 carries the part from the screwing position, and moves to an assembly process for another part.

As described above, in the screwing system according to an embodiment of the present invention, the robot 1 can hold the part, carry the part to and from the screwing position, and at the same time, tighten the screws with a variety of postures while holding the part. A series of operations of carrying in, screwing, and carrying out can be performed without performing the following operations: the part once held by the robot is released and placed on the workbench; and the part on the workbench is held again by the robot. Accordingly, a takt time can be reduced. In addition, the screwing operation can be performed without providing workbenches for parts with different postures. Thus, the cost and installation space can be reduced.

In the robot system according to an embodiment of the present invention, a robot can carry a part to and from a screwing position. In addition, while the robot holds the part without a workbench, screwing can be performed. Thus, a series of operations of carrying in, screwing, and carrying out can be performed without performing the following operations: the part once held by the robot is released and placed on the workbench; and the part on the workbench is held again by the robot. Accordingly, a takt time can be reduced. The robot can also change the posture of the held part. Thus, the robot can deal with tightening of a plurality of screws which have different postures and, since the workbench is unnecessary, reduce the cost and installation space.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-076678, filed Apr. 2, 2013 which is hereby incorporated by reference herein in its entirety.

What is claimed is:

1. A screwing system comprising:
   a plurality of screw feeders;
   a screwing device configured to move in one direction on a plane between the plurality of screw feeders and a screwing position and tighten a screw, obtained by the screwing device from one of the plurality of screw feeders, on a part at the screwing position; and
   a robot capable of holding the part,
   wherein the screwing position is aligned, in the one direction, with each screw obtaining position where the screwing device obtains a screw from the respective plurality of screw feeders,
   wherein the robot carries the held part to the screwing position, changes a posture of the part, and carries the part from the screwing position, and
   wherein, while the robot holds the part, the screwing device screws the part.

2. The screwing system according to claim 1, further comprising a screwing assist mechanism unit including a mechanism configured to press and support a part holding unit of the robot when the part is screwed.

3. The screwing system according to claim 2, wherein the screwing assist mechanism unit includes a mechanism configured to press and support the part held by the robot when the part is screwed.

* * * * *